N. G. SWIFT.
Fertilizer.
No. 1,796. / 32,800.
Patented July 9, 1861.
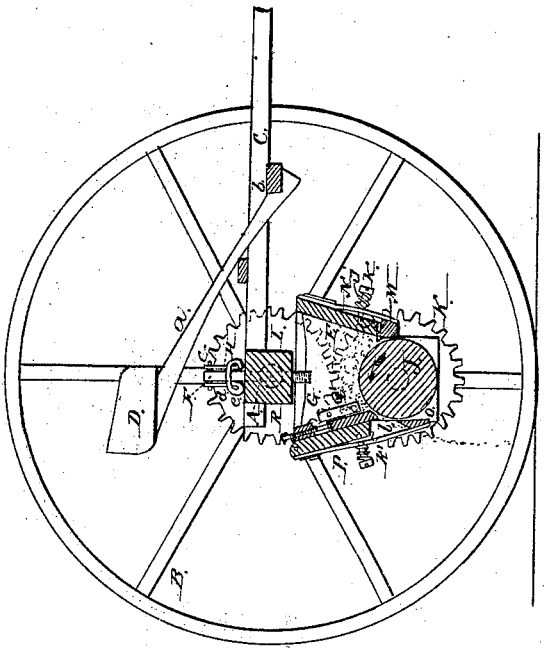
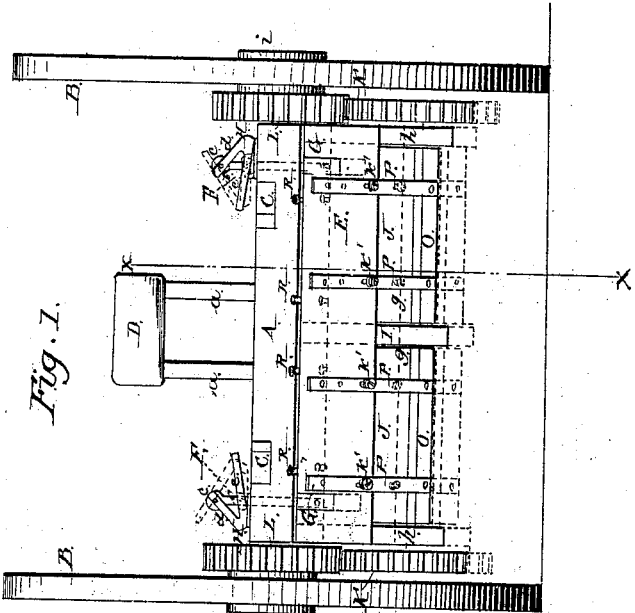

UNITED STATES PATENT OFFICE.

N. G. SWIFT, OF HART'S VILLAGE, NEW YORK.

IMPROVEMENT IN MACHINES FOR SOWING PULVERULENT MANURES.

Specification forming part of Letters Patent No. 32,800, dated July 9, 1861.

*To all whom it may concern:*

Be it known that I, N. G. SWIFT, of Hart's Village, in the county of Dutchess and State of New York, have invented a new and Improved Machine for Sowing Plaster and other Pulverulent Manures; and I do hereby declare that the following is a full, clear, and exact description of the same, reference being had to the annexed drawings, making a part of this specification, in which—

Figure 1 is a back view of my invention; Fig. 2, a side sectional view of the same, taken in the line $x\ x$, Fig. 1.

Similar letters of reference indicate corresponding parts in the two figures.

This invention consists in the employment or use of a roller or rollers placed within a hopper and arranged with adjustable slides and with scrapers, substantially as hereinafter described, whereby the discharge of the manure from the hopper may be regulated as desired and the portions of manure which may adhere to the rollers scraped off at such a point as not to affect the equal distribution of the manure over the field.

The invention further consists in a novel way of arranging the hopper, as hereinafter fully shown and described, whereby the roller or rollers may be readily thrown in and out of gear with the driving-wheels.

To enable those skilled in the art to fully understand and construct my invention, I will proceed to describe it.

A represents an axle, and B B wheels, the latter being placed loosely on the axle.

C C are thills attached to the axle A, and D is the driver's seat, which is secured to the upper part of inclined bars $a\ a$, attached to a cross-bar, $b$, of the thills C C.

E represents a hopper or manure-box, which is equal in length to the axle A, and is suspended underneath the axle by means of vertical rods F F, the latter being attached to cross-bars G G, at the upper part of the hopper, one near each end. The rods F F pass directly through the axle A, and to the upper ends of the rods F F there are attached, by pivots $c$, bow-shaped rods H H, one to each rod F. The rods H are curved so as to form acute angles at a short distance from their pivots $c$. (See more particularly Fig. 1.)

$d$ represents the short and $e$ the long part of the rods H. By means of the rods H H, the hopper E is kept in a proper position, which is an elevated one, the hopper being adjusted clearly to the under side of the axle, and this position is attained by adjusting the rods H so that their long parts $e$ will be in contact with the upper surface of the axle, as shown in blue, Fig. 1. To lower the hopper E, the rods H are adjusted so that their short parts $d$ will be in contact with the upper surface of the axle A, as shown in red outline in Fig. 1. The hopper E is divided into two equal compartments by a transverse partition, I, and the bottom of each compartment of the hopper is formed by a roller, J, the inner journals, $g$, of which have their bearings in the partition I, the outer journals, $h$, having their bearings in the end pieces of the hopper.

On the outer journals, $h$, which extend through the end pieces of the hopper, toothed wheels K K are placed, one on each journal, and into these wheels K K toothed wheels L L, at the inner ends of the hubs $i$ of the wheels K, gear—that is to say, when the machine is in working condition.

At the front sides of the rollers J J a bar, M, is pressed by springs N N, the latter being attached to the front side of the hopper, and, if necessary, spiral springs $j$ may be applied to them by means of screws $k$, the latter passing through the springs N N into the hopper. By turning the screws $k$, the spiral springs $j$ may be made to bear with a greater or less degree against the springs N N, and the pressure of the bar M, therefore, against the rollers J J may be regulated as desired. The springs $j$, however, might probably be dispensed with. The bar M prevents the escape of manure at the front side of the rollers J J, the springs N effectually compensating for all wear of the bar M.

Against the back parts of the rollers J J bars or scrapers O O bear, one against each roller. These scrapers may be of wood, and provided with an upper beveled surface, to form an acute edge to bear against the rollers. The scrapers O O are attached to springs P, which are secured to the back part of the hopper, and by which the scrapers are made to press against the rollers J J. The springs P may have supplemental springs $k'$ applied to them, like the supplemental springs $j$ of the springs N N.

At the inner side of the hopper E, at its back part, there are placed two slides, Q Q, one in each compartment. These slides are adjusted by screws R R, and by their adjustment the capacity of the discharge-orifices $l$, at the back part of the hopper, may be graduated as desired.

The operation is as follows: As the machine is drawn along, the rollers J J are rotated by the gearing K L in the direction indicated by the arrow in Fig. 2, and the manure in the hopper is discharged at the back part of the rollers, as indicated in red, Fig. 2, the flow being regulated by adjusting the slides Q Q. Any manure that might chance to adhere to the rollers J J is scraped therefrom by the scrapers O O at a point just below the discharge-orifices, so that the manure scraped from the rollers will not render the discharge or flow of manure unequal—a contingency which would occur if the scrapers O O were placed at the front of the rollers J J. The rollers are rendered inoperative at any time by simply adjusting the rods H so that the hopper may drop to its lowest position, at which point the wheels K are out of gear with the wheels L.

This machine will sow any pulverulent manure—such as ashes, lime, gypsum, &c.—in a broadcast and perfect manner.

I do not claim, broadly, the employment or use of rollers J J, placed in a hopper, to serve as a manure-distributer; but I do claim as new and desire to secure by Letters Patent—

1. The combination of the hopper E, the roller or rollers J, slides Q, scrapers O O, and pressure-bar M, all arranged for joint operation, as and for the purpose set forth.

2. Suspending the hopper E to the axle A by means of the rods F F and H, arranged substantially as shown, whereby the wheels K L may be readily thrown in and out of gear, and the rollers J J consequently rendered operative or inoperative, as may be desired.

N. G. SWIFT.

Witnesses:
HENRY H. SWIFT,
M. M. LIVINGSTON.